Figure 1:
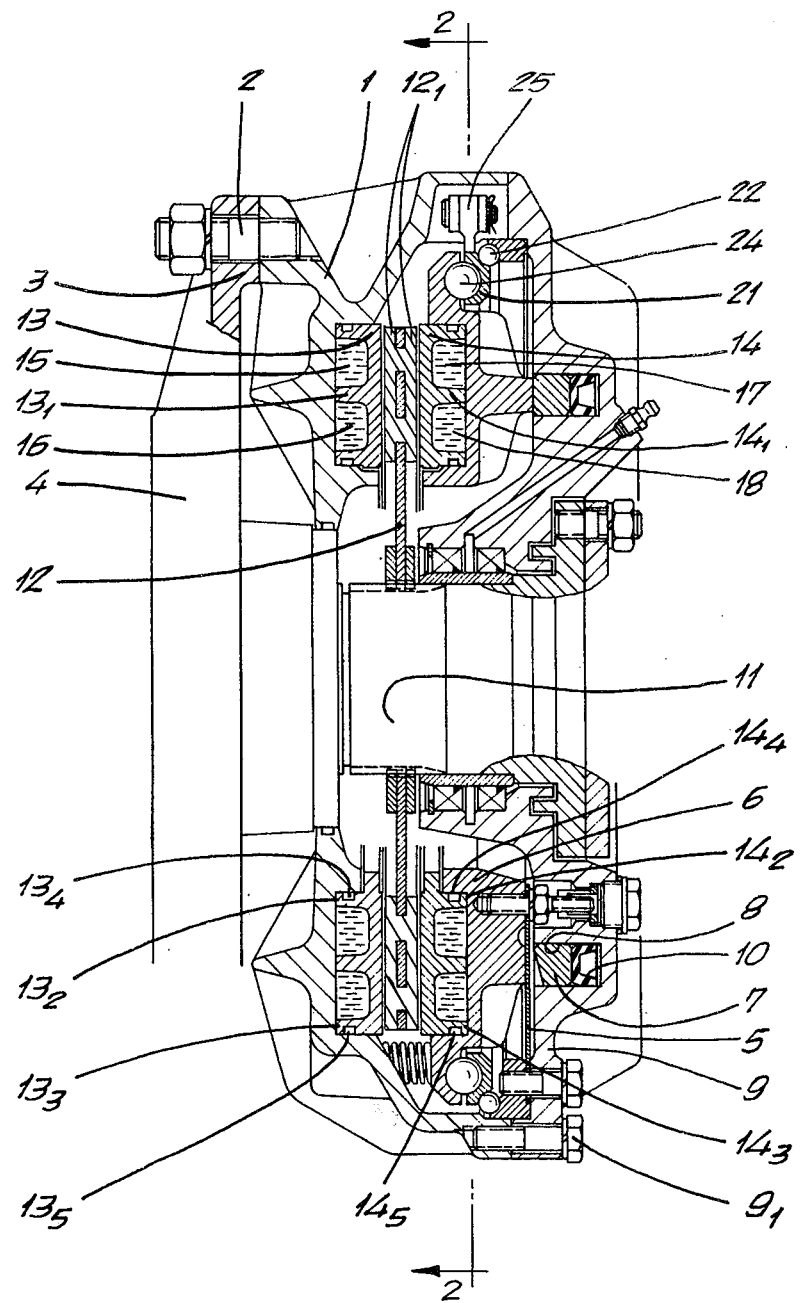

United States Patent [19]
Klaue

[11] 3,915,262
[45] Oct. 28, 1975

[54] LIQUID COOLED DISC BRAKE

[76] Inventor: Hermann Klaue, 24, Tour D'Ivoire, 1820 Montreaux, Switzerland

[22] Filed: Mar. 14, 1973

[21] Appl. No.: 340,959

Related U.S. Application Data

[63] Continuation-in-part of Ser. No. 169,966, Aug. 9, 1971, abandoned.

[30] Foreign Application Priority Data

| Aug. 7, 1970 | Germany | 2039287 |
| Oct. 22, 1970 | Germany | 2051863 |
| Apr. 6, 1972 | Switzerland | 5023/72 |
| Mar. 1, 1973 | Switzerland | 2990/73 |

[52] U.S. Cl. ............ 188/71.6; 188/72.6; 188/72.7; 188/73.6; 188/264 D; 192/70.12; 192/70.13; 192/113 B
[51] Int. Cl.² ..................... F16D 65/853
[58] Field of Search .... 188/71.5, 71.6, 73.6, 264 D, 188/72.7, 72.6, 106 F; 192/113 B, 70.12, 70.13, 70.23

[56] References Cited
UNITED STATES PATENTS

| 1,894,001 | 1/1933 | Myers | 188/264 D |
| 2,652,912 | 9/1953 | Bernardo | 192/70.13 |
| 2,747,702 | 5/1956 | Zelm | 188/164 D |
| 3,000,470 | 9/1961 | Milan | 188/264 D X |
| 3,022,867 | 2/1962 | Maloney et al. | 188/71.6 X |
| 3,047,105 | 7/1962 | Schwartz | 188/264 D |
| 3,435,936 | 4/1969 | Warman | 192/113 B |
| 3,674,118 | 7/1972 | Klaue | 192/70.23 X |
| R27,126 | 5/1971 | Gingery | 192/70.13 |

*Primary Examiner*—George E. A. Halvosa
*Attorney, Agent, or Firm*—Larson, Taylor and Hinds

[57] ABSTRACT

A full lined liquid cooled disc brake for a rotating shaft. The brake has a brake housing comprising two annular housing members fastened together at their outer circumference and providing a central opening. The shaft or a sleeve member connected with the shaft extend in this opening carrying at least one lamination. The brake housing may have an opening at the outer circumference for easily replacing the lamination without opening the coolant circulation. The brake has annular brake rings on opposite sides of and opposing a lamination. Each brake ring is cooled on its side opposite from its braking surface with coolant flowing therethrough. A continuously operable adjusting mechanism for taking up play may be included. The brake may include both a mechanical and a hydraulic operating mechanism for urging the thrust rings towards each other to operate the brake.

17 Claims, 11 Drawing Figures

Fig. 4 (A-B)

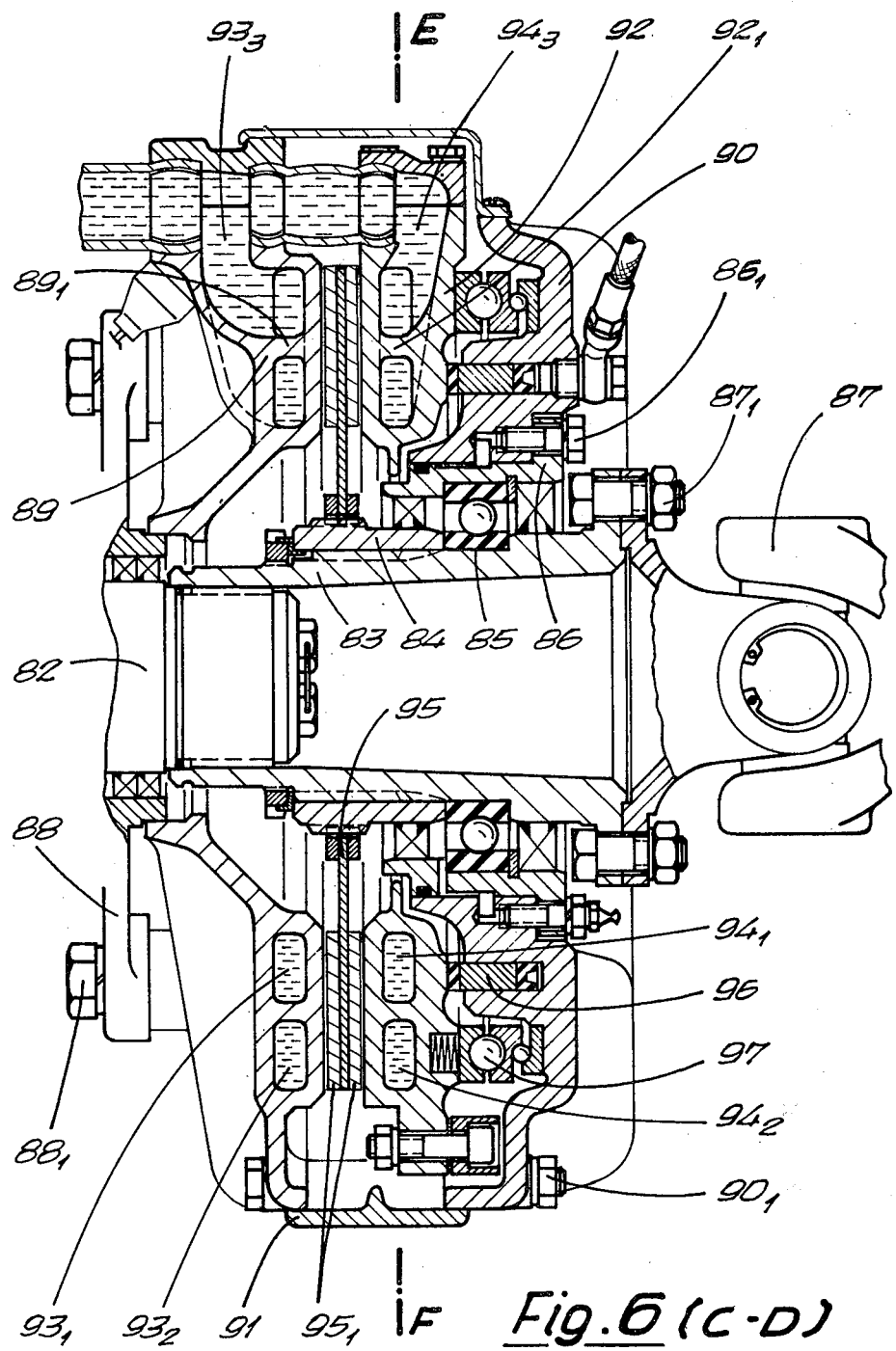
Fig.6 (C-D)

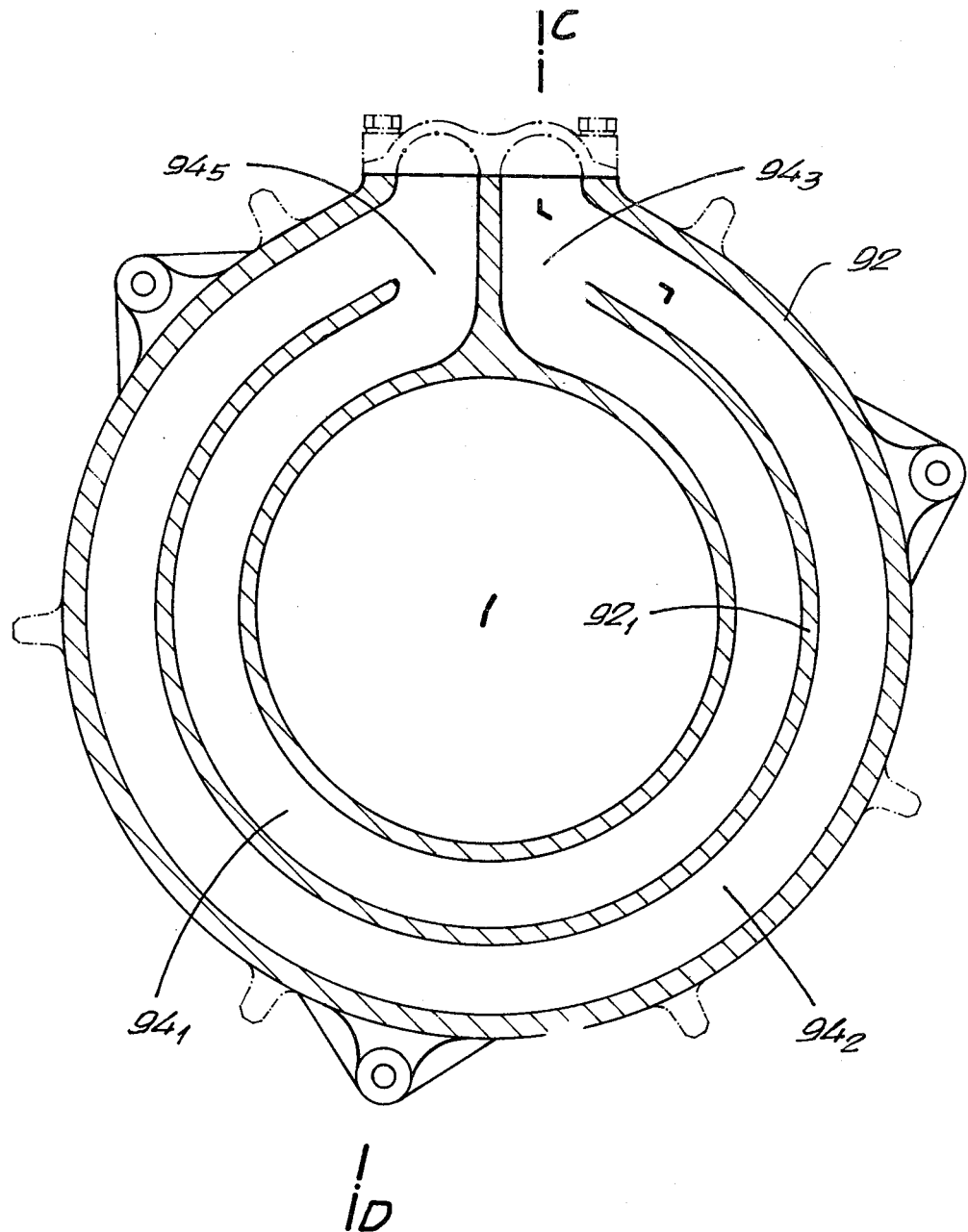
Fig. 7 (E-F)

Fig. 8 (G-H)

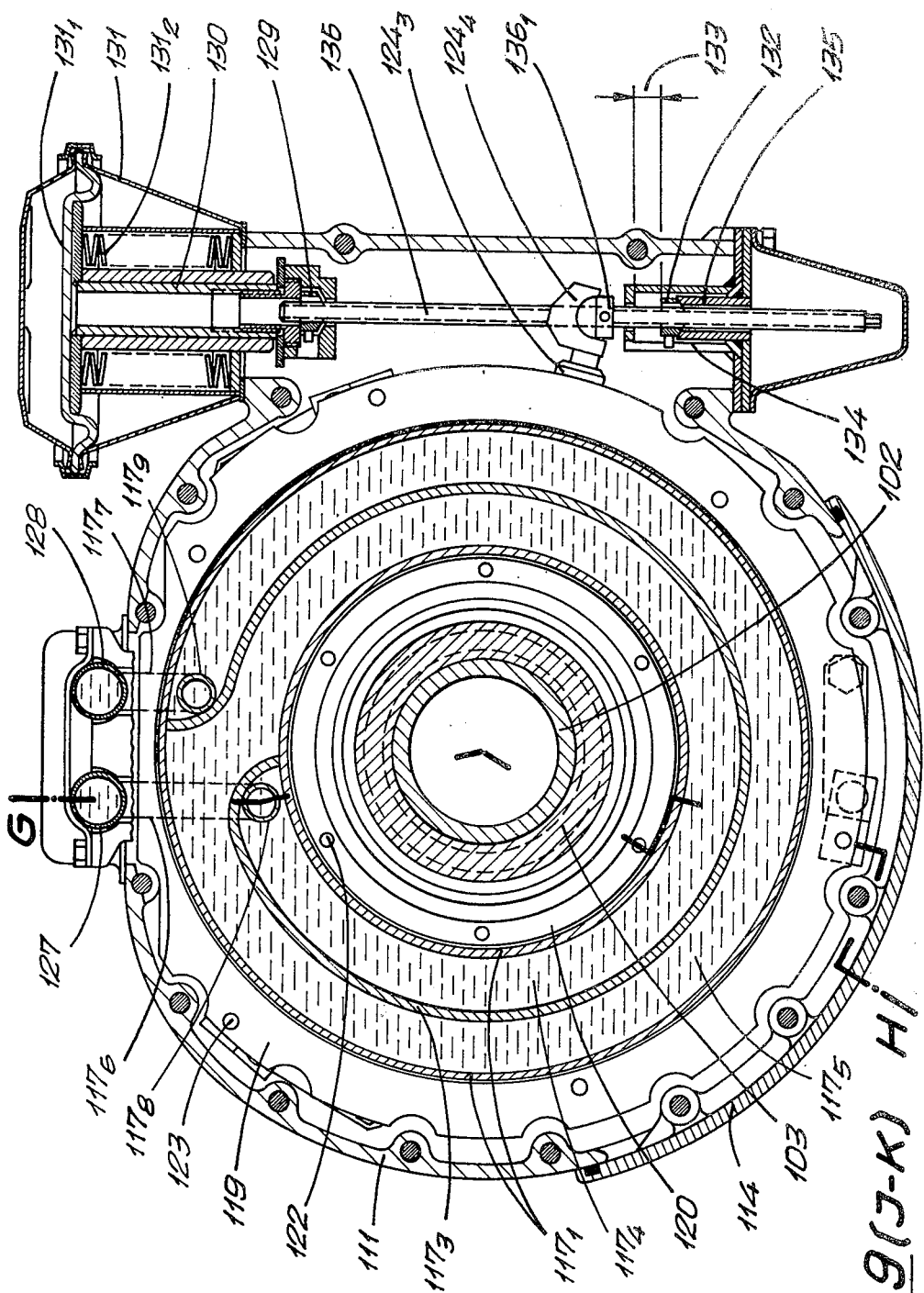

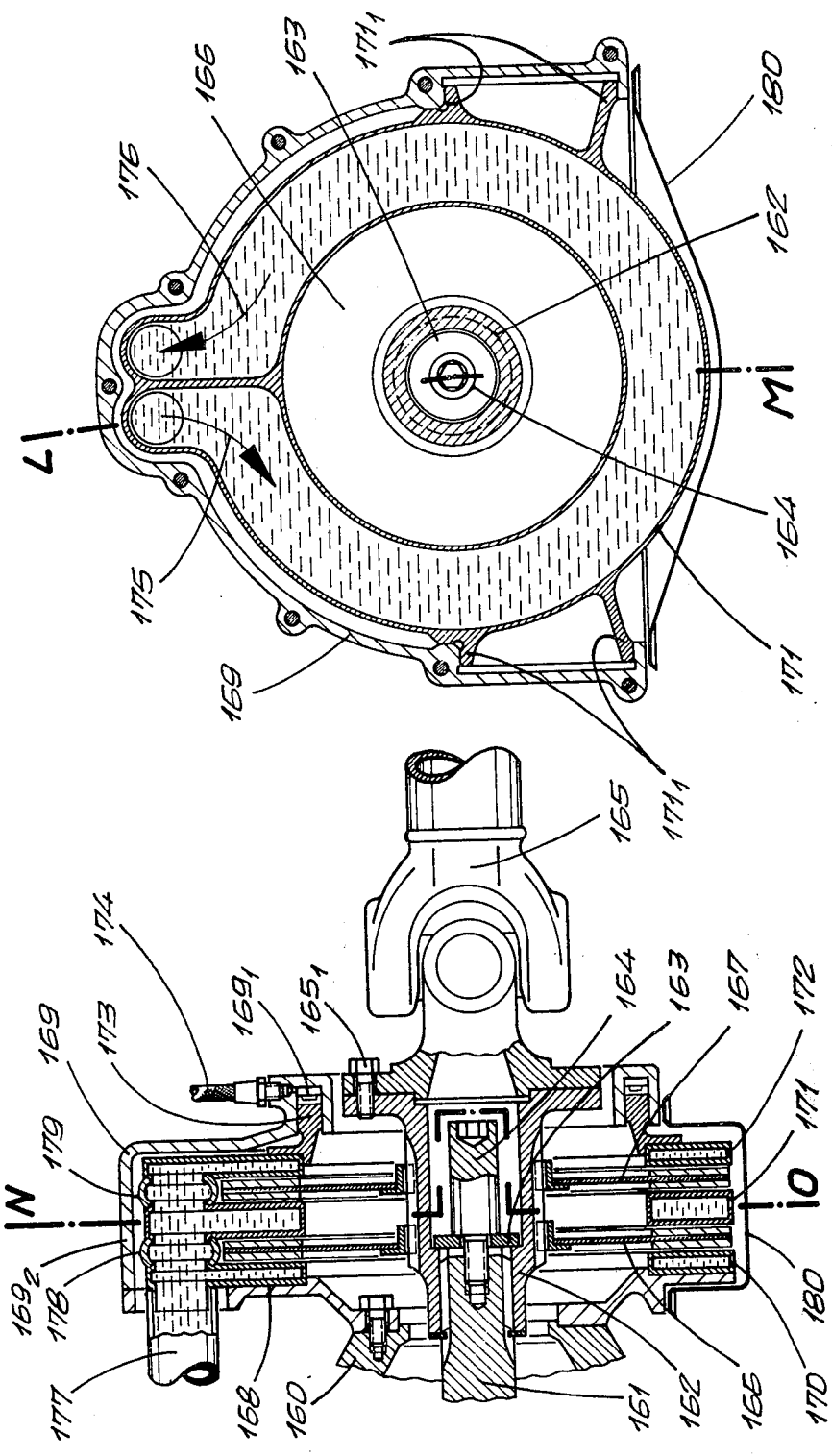

LIQUID COOLED DISC BRAKE

This application is a continuation-in-part of parent application Ser. No. 169,966 filed Aug. 9, 1971, now abandoned.

BACKGROUND OF INVENTION

This invention relates to a brake assembly for vehicles, and more particularly to a disc brake for a rotating shaft including friction elements which are cooled by a circulating liquid.

Liquid cooled disc brakes have already been known wherein axially movable non-rotatable friction elements are provided on each side of a rotating lined lamination, the friction elements being cooled by a circulating liquid and mounted on a support. A brake member rotating with the axle to be braked is provided with the lamination for rotation therewith and for radial movement thereon.

It is the main object of this invention to provide a new and improved liquid cooled brake assembly of this type with improved brake performance.

It is another object of this invention to provide a new and improved brake construction permitting simplified removal of a worn lamination.

It is another object of this invention to provide a disc brake assembly with an improved coolant circulating system providing improved cooling performance by the action of encreased fluid speed in the brake parts to be cooled.

It is another object of this invention to provide a disc brake assembly having a means for continuously adjusting the distance between the linings and the braking surfaces.

It is another object of this invention to provide a disc brake assembly having both mechanical and hydraulic means for operating the brake disc.

It is another object of this invention to provide a new disc brake assembly having a brake housed mounted to a stationary part of the vehicle and consisting of two annular housing members joined together at their outer circumference and providing a central opening, a sleeve member extending into this opening being removably fastened to a shaft to be braked for rotation therewith, an axially movable lamination having friction linings and mounted on the sleeve member for rotation therewith, a brake ring mounted in one housing member and a brake ring mounted in an axially movable thrust ring arranged between the other housing member and the lamination, both brake rings having a braking surface adjacent and facing the linings of the lamination and being provided with an annular channel system connected to a coolant circuit providing a coolant flow path therethrough, means for urging the thrust ring against the lamination, and a cover located on an opening at the outer periphery of the brake housing, the cover being removable from this opening thus permitting the lamination to be pulled out and introduced there through after axial removal of the sleeve member without opening the coolant circuit.

Figure 2:
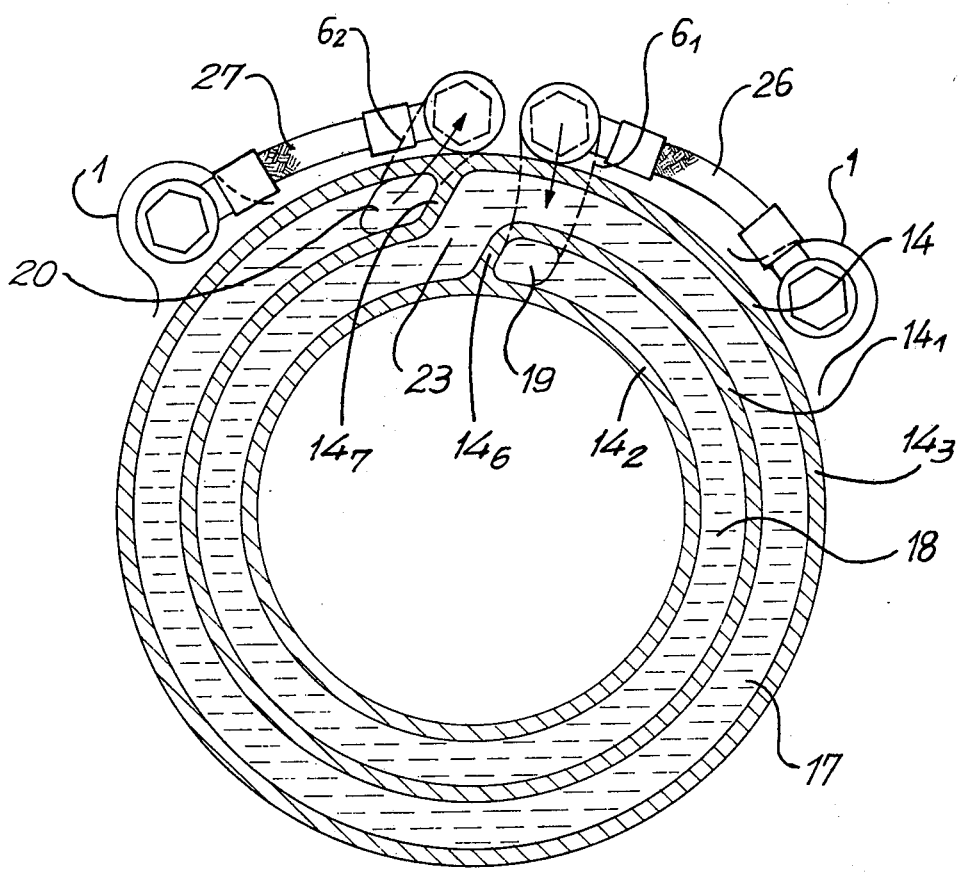
Figure 3:
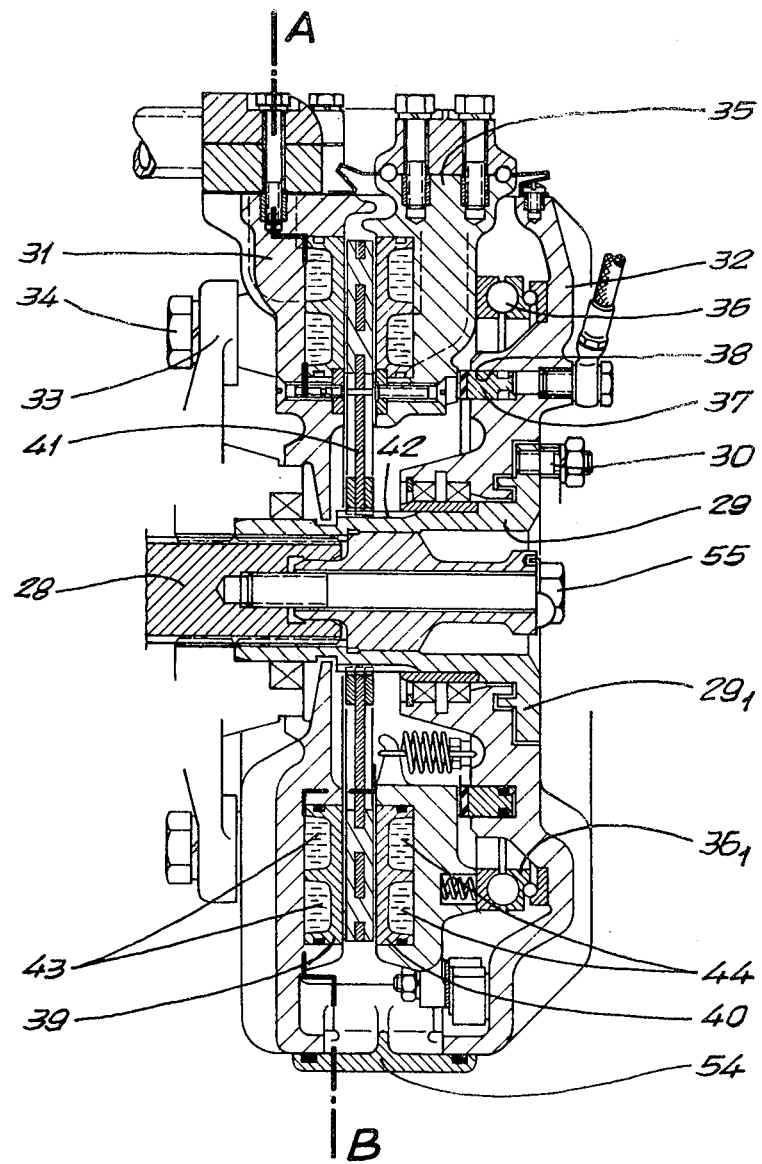
Figure 4:
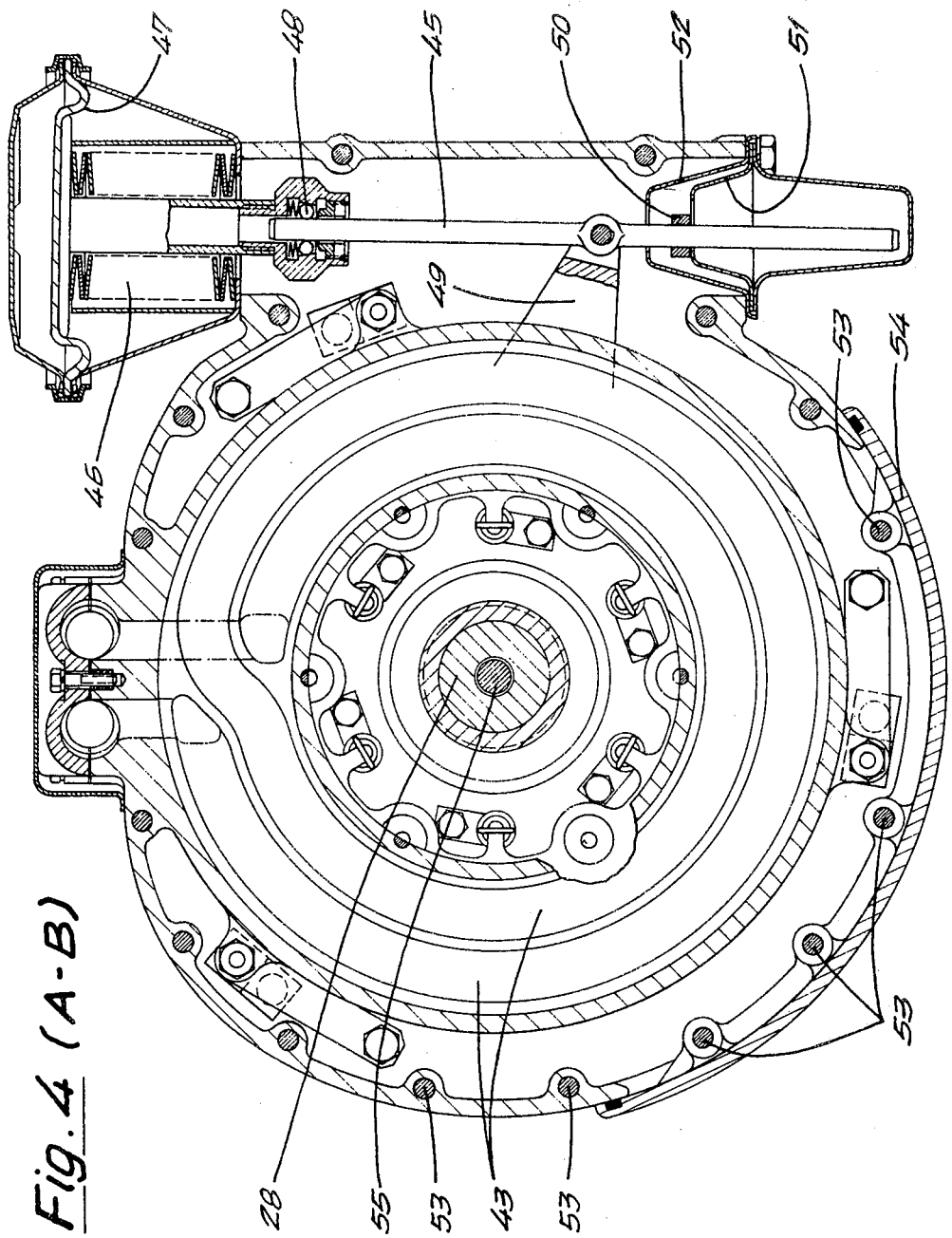
Figure 5:
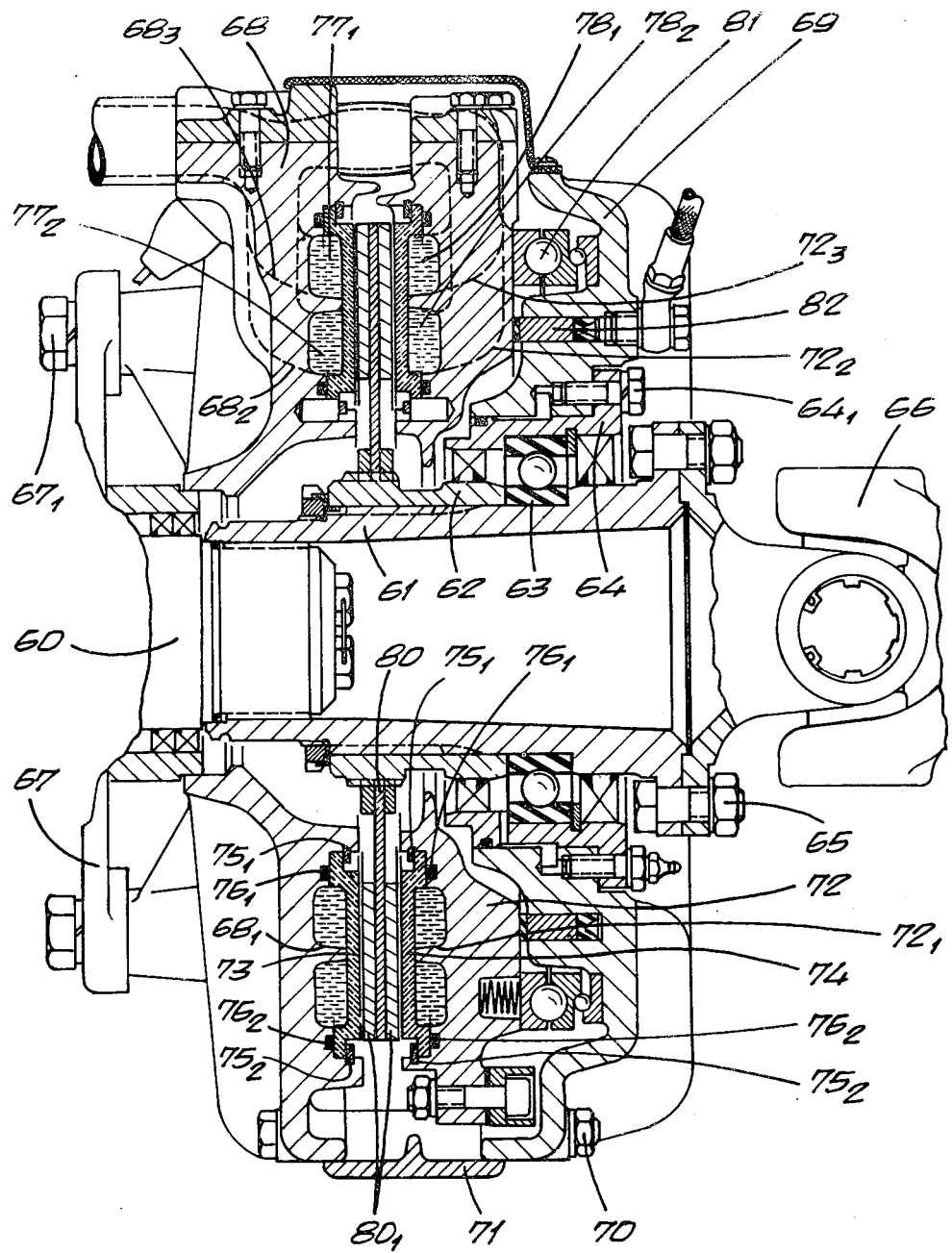

The above and other objects of the invention will become apparent from the detailed description taken in conjunction with the drawings, wherein:

FIG. 1 is a view of a vertical section through a liquid cooled brake employing a lamination mounted on a shaft to be braked, FIG. 2 is a view of a cross section through a brake ring of the brake of FIG. 1 taken along line 2—2 of FIG. 1, FIG. 3 is a view of a vertical section through a preferred embodiment of a liquid cooled brake employing a lamination mounted on a removable sleeve member, FIG. 4 is a view of a cross section taken along line A–B of FIG. 3, FIG. 5 is a view of a vertical section through a brake similar to FIG. 3 having modified brake rings and a modified sleeve member, FIG. 6 is a view of a vertical section through an embodiment employing concentric casted channels, FIG. 7 is a sectional view of a cross section taken along line E–F of FIG. 6, FIG. 8 is a view of a vertical section through a further preferred embodiment of the liquid cooled disc brake employing hollow brake rings, a completely closed coolant system and a new closure adjusting means, FIG. 9 is a view of a cross section taken along line K–J of FIG. 8, FIG. 10 is a view of a vertical section through a liquid cooled multiple disc brake constructed in accordance with the principles of the invention, FIG. 11 is a view of a cross section taken along line N–O of FIG. 10, Referring to FIGS. 1 and 2 of the drawings, the brake assembly includes a driven shaft 11 and an axially movable fully lined lamination 12 mounted on a splined profile on the shaft 11. The brake housing includes the annular disc-like housing member 9 and the annular disc-like housing member 1. The housing member 1 is attached by means of bolts 2 to the extensions 3 of the gear box 4. The housing member 9 is fastenend by means of the srews $9_1$ to the circumference of the housing member 1. A non-rotatable but axially movable thrust ring 6 located between the cover 9 and the lamination 12 is mounted by way of elastic sheet metal segments 5 to the brake housing. For braking operation the thrust ring 6 is axially moved towards the lamination by either hydraulic actuating means or by mechanically operated means. The hydraulic means include a ring piston 7 housed in an annular cylinder 8 formed in the housing member 6 and an annular sealing collar 10. The mechanically operated means include a spreading mechanism comprising an annular actuating ring 21 supported by means of balls 22 on the housing member 9, balls 24 in races between the ring 21 and the thrust ring 6, and a lever 25 at the actuating ring 21 to shift angularly the actuating ring 21 against the thrust ring 6.

The housing member 1 and the thrust ring 6 are each provided with an annular recess to take up the brake rings 13 and 14, respectively. The brake rings 13 and 14 have braking surfaces adjacent and facing the linings of the lamination. At their back side the brake rings 13 and 14 have inner, outer and central annular flanges $13_2$, $13_3$, $13_1$, and $14_2$, $14_3$, $14_1$, respectively, projecting in the recess and constituting two concentric annular channels 15, 16 in the recess of the housing member 1 and two concentric annular channels 17, 18 in the recess of the thrust ring 6. Sealing means $13_4$, $14_4$ and $13_5$, $14_5$ at the inner and outer flanges respectively seal the channels. As shown for brake ring 14 a fluid supplying channel $6_1$ is casted in the thrust ring 6 providing a fluid inlet opening 19 for the inner channel 18. A casted drain channel $6_2$ in the thrust ring 6 provides a fluid outlet opening 20 in the outer channel 17 adjacent the inlet opening 21. Between the inlet and outlet opening the two rib ends $14_6$ and $14_7$ are connected to the inner and outer flanges $14_2$ and $14_3$, respectively, constituting the beginning of the inner channel 18 and the ending of the outer channel 17 and a fluid passage 23 between the two channels. The fluid, preferably water, is supplied through the hose 26, channel $6_1$ and inlet opening 19, it circulates twice around the brake ring 14 and leaves through outlet opening 20, channel $6_2$ and drain hose 27. The same channel system is provided in brake ring 13.

FIGS. 3 and 4 illustrate a preferred embodiment of the brake assembly wherein the lamination is mounted on a removable sleeve member providing improved replacement of the lamination. The sleeve member 29 is positioned with the one end on the driven shaft 28 and mounted thereto by means of the srew 55. The other end of the sleeve member 29 is formed with a flange $29_1$ adapted for mounting the cardan shaft (not shown) by means of the crews 30. The sleeve member 29 has a splined profile 42 and an axially movable lamination 41 mounted thereon for rotation. The brake housing includes the annular disc-like housing member 31 and the annular disc-like housing member 32. The housing member 31 is attached by means of the srews 34 to a stationary carrier 33 which is part of the gear box. The housing member 32 is fastened by means of the screws 53 to the circumference of the housing member 31. The housing member 32 and the brake housing member 31 are each formed with an adjacent recess along a part of their circumference providing an opening at the respective area of the periphery of the brake housing. The opening is closed with a cover 54 fastened by means of severals of the same srews 53 which join the housing members together. This opening enables the lamination to be replaced therethrough without opening the coolant circulation. For this purpose, the srew 55 is loosened and the sleeve member 29 is removed in the axial direction.

A non-rotatable axially movable thrust ring 35 is located between the housing member 32 and the lamination 41. For braking operation the thrust ring 35 is moved towards the lamination by action of hydraulic means or mechanically operated means. The hydraulic means comprise the ring piston 37 in the ring cylinder 38 formed in the housing member 32, the mechanical means include a spreading device 36 comprising a rotable actuating ring $36_1$. Because such actuating means are shown in my co-pending application Ser. No. 288,287, filed Sept. 2, 1972, they are not described in detail.

The actuating ring $36_1$ is rotated by a spring cylinder 46 via the bar 45 and the lever 49. To provide a constant cleaance the position of the bar is controlled by a clamping ring 50 positioned between two hoods 52 and 51 providing an upper and a lower rest for the clamping ring 50. If the movement of the bar 45 exceeds the distance defined by the two hoods, the clamping ring 50 will fit against the hood 52, and with the aid of a free-wheeling mechanism 48 will cause adjustment of the bar 45.

The housing member 31 and the thrust ring 35 are each provided with an annular recess to take up the brake rings 39 and 40. The brake rings are formed as shown in the embodiment of FIGS. 1 and 2 and provide a channel system 43, 44 as described before. The brake rings are made of a heat conducting material, preferably of a copper alloy.

The FIG. 5 illustrates another embodiment of the invention similar to the embodiment shown in FIGS. 3 and 4 employing modified supporting means for the sleeve member and modified brake rings.

The sleeve member 61 is positioned with the one end on the driven shaft 60 for rotation therewith. At its other end the sleeve member 61 is formed with a flange adapted for mounting the cardan shaft 66 by means of the srews 65. The sleeve member 61 is journalled by means of the roller bearings 63 in the ring member 64 which is fastened to the housing member 69 by means of srews $64_1$. The full lined lamination 80 is mounted on a splined profile of a sleeve 62 which is carried by the sleeve member 61 for rotation therewith. The brake housing includes the annular brake members 68 and 69. The housing member 68 is attached to a stationary carrier 67 by means of srews $67_1$. The housing member 69 and the housing member 68 are joined together at their circumference by means of the srews 70. The two housing members 68 and 69 are each formed with an adjacent recess along a part of their circumference providing a peripheral opening of the brake housing. The opening is closed with a cover 71 which is fastened also by means of srews 70. The opening enables the lamination to be replaced therethrough without interrupting the coolant circulation. For this purpose the srews $64_1$ are loosened and the sleeve member 61 is removed in the axial direction.

A non-rotatable axially movable thrust ring 72 is located between the housing member 69 and the lamination 80. For braking operation the thrust ring 72 is axially moved towards the lamination by action of hydraulic means or mechanically operated means. The hydraulic means comprise the ring portion 82 in a ring cylinder formed in the housing member 69, the mechanical means including a spreading device 81 supported by the housing member 69. Because these actuating means are shown in my co-pending application Serial No. 288.287, they are not described in detail. The housing member 68 and the thrust 72 are each provided with an annular recess having a central annular rib $68_1$ and $72_1$ separating the recesses into two concentric channels $77_1$, $77_2$ and $78_1$, $78_2$ respectively. Both recesses are covered by the annular brake rings 73 and 74. The brake rings 73 and 74 have side flanges and are fastened therewith by means of spring rings $75_1$ and $75_2$ at the inner and outer circumference of the recesses. Sealing rings $76_1$ and $76_2$ between the side flanges and the housing members seal the channels. The brake rings have braking surfaces adjacent and facing the linings $80_1$ of the lamination. The fluid is supplied through the casted inlets $68_2$ and $72_2$ into the channels $77_2$ and $78_2$, respectively, and leaves after two circulations the outer channels $71_1$ and $78_1$ through the casted outlets $68_3$ and $72_3$ respectively. To provide an equal cooling for the brake ring the cross section of the flow path in the brake ring must be of the same value in all its parts. The brake housing is made of light metal, preferably of an aluminium alloy. The brake rings consist of a resistant heat conducting material, preferably of an copper alloy including 1 % chromium. Liquid cooled disc brakes of this type have been tested, some results are shown at the end of the specification. It has been found that the coolant system must be designed to provide a fluid speed 1 to 3 meters per second through the channels.

FIGS. 6 and 7 show an embodiment wherein, as in FIGS. 1-4, the brake rings 73 and 74 are omitted and the braking surfaces are provided on one of the brake housing members and on the thrust ring. The sleeve member 83 is positioned with the one end on the driven shaft 82 for rotation therewith. At its other end the sleeve member 83 is formed with a flange adapted for mounting the cardan shaft 87 by means of the srews $87_1$. The sleeve member 83 is journalled by means of the roller bearings 85 in the ring member 84 which is fastened to the housing member 90 by means of srews $86_1$. The full lined lamination 95 is mounted on a splined profile of a sleeve 84 which is carried by the sleeve member 83 for rotation therewith. The brake housing includes the annular disc-like housing member 90 and the housing member 89. The housing member 89 is attached to a stationary carrier 88 by means of srews $88_1$. The housing member 90 and the housing member 89 are joined together at their circumference by means of the srews $90_1$ and both members are formed with an adjacent recess along a part of their circumference providing a peripheral opening. The opening is closed with a cover 91 which is fastened also by means of the srews $90_1$. The opening enables the lamination to be replaced therethrough without interrupting the coolant circulation. For this purpose the srews $90_1$ are losened and the sleeve member 83 is removed in the axial direction.

A non-rotatable axially movable thrust ring 92 is located between the cover 90 and the lamination 95. For braking operation the thrust ring 92 is moved towards the lamination by action of hydraulic means or mechanically operated means. The hydraulic means comprise the ring piston 96 in a ring cylinder formed in the housing member 90, the mechanical means including a spreading device 97 which is supported by the housing member 90. Because these actuating means are shown in my co-pending application Ser. No. 288,287, they are not described in detail. The housing member 89 and the thrust ring 92 are each formed with annular braking surfaces adjacent and facing the linings $95_1$ of the lamination 95. At the back side of the braking surfaces are two concentric annular channels $93_1$, $93_2$ and $94_1$, $94_2$, respectively, casted in the housing member 89 and the thrust ring 92. FIG. 7 shows the cross-section through the channels of the thrust ring 9, accordingly formed are the channels of the housing member 89. In contrast to the other embodiments described above, the channels are not passed by the coolant in succession. Common fluid inlet and outlet openings $94_3$ and $94_5$ are provided for the channels $94_1$ and $94_2$ respectively which are separated by the rib $92_1$. Each of the channels have preferably an equal cross section at all of its portions along the flow path and the sum thereof should not exceed the flow path cross sections of the inlet or the outlet openings as well as the supplying or the drain means. The housing member 89 and the thrust ring 92 are preferably made of a heat conducting material, preferably of a hard copper alloy. The coolant system connected to the channels is preferably designed to provide a fluid speed of 1 to 3 meters per second in each of the channels. The provision of the channels within the housing member 89 and the thrust ring 92 is advantageous in respect of a simplified production and in that no sealing means is afforded. As casted channels, however, provide a relatively rough surface the coolant flow therealong my be disturbed. Because the heat dissipation between a wall and a passing cooling medium is proportional to the velocity of the medium the rough surfaces may impair the heat dissipation.

To obviate this disadvantage the preferred embodiment illustrated in FIGS. 8 and 9 has channels totally enclosed by the brake rings so that no sealing means are afforded. The embodiment further employs the preferred sleeve member arrangement of FIG. 5, a channel system as shown in FIGS. 2 and 4 and an improved adusting means.

The sleeve member 102 is positioned with the one end on the driven shaft 101 for rotation therewith. At its other end the sleeve member is formed with a flange adapted for mounting the cardan shaft 106 by means of the srews 105. The sleeve member 102 is journalled by means of the roller bearings 104 in the ring member 107 which is fastened to the housing member 112 by means of srews 108. The full lined lamination 115 is mounted on a splined profile of a sleeve 103 which is carried by the sleeve member 102 for rotation therewith. The brake housing includes the annular housing member 112 and the housing member 111. The housing member 111 is attached to a stationary carrier 110 by means of screws $110_1$. The housing member 112 and the housing member 111 are joined together at their circumference by means of the srews 123. The two housing members 111 and 112 are each formed with an adjacent recess along a part of their circumference providing a peripheral opening. The opening is closed with a cover 114 which is fastened also by means of the screws 113. The opening enables the lamination to be replaced therethrough without disconnecting the coolant system. For this purpose the screws 108 are loosened and the sleeve member 102 is removed in the axial direction.

A non-rotatable axially movable thrust ring 116 is located between the housing member 112 and the lamination 115. For braking operation the thrust ring 116 is moved towards the lamination by action of hydraulic means or mechanically operated means. The hydraulic means comprise the ring piston 125 in a ring cylinder 126 formed in the housing member 112, the mechanical means including a spreading device which is supported by the housing member 112. The spreading device includes two actuating rings $124_1$ and $124_2$ and balls 124 in ramps therebetween. Because the actuating means are shown in my co-pending application Ser. No. 288.287, they are not described in detail. The actuating ring $124_1$ is rotated by the action of the spring cylinder via the tread spindle 136, the fork member $124_4$ resting on the thrust mean $136_1$ and the extension $124_3$ of the actuating ring $124_1$. The spring cylinder includes the diaphragm $131_1$, the cup springs $131_2$ and the spindle actuating means 130. In FIG. 9 the brake is shown in the released position wherein the room above the diaphragm is air-compressed and the spring $131_2$ is loaded. To effect braking operation air is released and the spring $131_2$ moves the spindle 136 through the ratchet nut 129 via the means 130 in the upward direction until friction contact. The spindle is provided with an automatic adjusting device comprising two sleeve members 134 and 135 which constitute a determined distance 133 on the spindle 136 and a ratchet nut 132 between the two sleeve members which provide an upper and a lower rest for the ratchet nut. When upward movement of the spindle exceeds the distance 133 the ratchet nut 132 skips threats and hinders the return movement of the spindle into the initial position. The annular brake rings 117 and 118 comprise the cover plates $117_1$, $118_1$, the back plates $117_2$, $118_2$ and the central ribs $117_3$, $118_3$ enclosing two concentric annular channels $117_4$, $117_5$ and $118_4$, $118_5$ respectively. The plates and ribs are made of a heat conducting material, preferably of a hard copper alloy, and fastened together by soldering connection so that no fluid is in contact with the housing members. The cover plates $117_1$ and $118_1$ provide braking surfaces adjacent and facing the linings of the lamination. The cover plates are formed with angular flanges at their inner and outer circumference. Elastic tension ring means 120 enabling radial expansion and screws 121 and 122 are provided to mount the brake rings on the housing member 111 and on the thrust ring 116, respectively. FIG. 9 shows a view of the cross section through the brake ring 117, whilst the brake ring 118 is formed accordingly. $117_6$ and $117_7$ designate inlet and outlet tube bends, $117_8$ is the inlet opening for the inner channel $117_4$ and $117_9$ is the outlet opening for the outer channel $117_5$. Between the inlet and outlet openings the rib ends are connected at the inner and outer circumferences of the brake ring respectively, providing the beginning of channel $117_4$ and the end of channel $117_5$. The fluid is supplied through the hose 127, circulates twice the brake ring and is discharged through the drain hose 128. The coolant system connected to the hoses 127 and 128 is designed to provide a fluid velocity of preferably 1 to 3 meters per second in the channels. The flow path cross section from the inlet opening through the channels and the outlet opening is preferably constant guaranteeing equal cooling of the brake ring.

FIG. 10 and 11 illustrate an embodiment employing two laminations 166 and 167 axially movable mounted on a splined portion of the sleeve member 162. The sleeve member 162 is mounted with one end on the rotating shaft 161 by means of the ring member 163 and the screw member 164. The cardan shaft 165 is attached with screws $165_1$ to the other end of the sleeve member. The brake housing includes the housing member 168 fastened to the gear box 160 and the disc-like housing member 169 having a peripheral rim $169_2$. A portion of this rim is omitted providing a peripheral opening which is closed by the cover 180. The laminations are replaceable through this opening when the sleeve member is removed far enough in the axial direction after loosening the screw 164.

Located between the housing member 169 and the lamination 167 is an axially movable annular thrust ring 173. The thrust ring is integrally formed with a ring piston interposed in a ring cylinder $169_1$ formed in the housing member 169 and actuated by fluid supplied through the pipe 174. The two laminations rotate between three annular brake rings 170, 171 and 172 which have braking surfaces adjacent and facing the linings. The brake ring 170 is fastened to the housing member 168, the brake rings 171 and 172 are axially movable. Each brake ring is provided with projecting extensions to abut the brake rings against rotation. For brake ring 171 the extensions are designated by $171_1$. The arrows 175 and 176 indicate the flowing direction of the coolant which is delivered by the supplying pipe 177 through the hose members 178 and 179. The size of the flow path cross section of the supplying pipe 177 must be at least the size of the sum of the flow path cross sections of all brake rings, and the flow path cross section in each brake ring should be constant and cooled by coolant having a velocity of 1 to 3 meters per second.

EXAMPLE: Example:

FIG. 5 shows on a scale of 2,5:1 a brake which was designed as a transmission brake and built for a 16-tons lorry with 300 PS engine power. The brake including the hydraulic and mechanically actuating equipment has a weight of 70 kp and may handle 200 PS permanent load. The outer circumference is 460 mm and the maximum brake moment is 700 mkp. This brake moment is afforded for stopping operation. The brake moment for permanent service braking is lower, at a speed of 1,540 revolutions per minute it is 100 mkp. The fluid velocity in the brake rings was 2,4 meters per second.

Although the invention has been described in detail with respect to preferred embodiments thereof, it will be apparent that the invention is capable of numerous modifications and variations apparent to those skilled in the art without departing from the spirit and scope of the invention.

What I claim is:

1. A liquid cooled disc brake for braking a rotatable member against rotation, comprising:

a stationary housing, a shaft to be braked extending axially through the housing, a brake disc means comprising at least one brake disc, mounting means for mounting the brake disc means for limited axial movement relative to the shaft and for rotational movement with the shaft, said mounting means being movable axially out of the plane of the brake disc means to permit the brake disc means to be removed directly from its operating position, in a radial plane, out of the housing, a brake ring fixedly connected to the housing and having a braking surface adjacent to and facing one side of the brake disc means, a thrust ring having a braking surface adjacent to and facing the opposite side of the brake disc means, means for mounting the thrust ring in the housing for axial movement relative to the housing against and apart from the brake disc means while preventing circumferential movement of the thrust ring about the shaft axis, actuating means for moving the thrust ring axially during a braking operation to urge the brake disc means and the braking surfaces against each other, each of said brake ring and thrust ring including, on the sides of their braking surfaces opposite from the brake disc means, means defining a coolant flow path for the flow of liquid for cooling the brake, the coolant flow path associated with each ring comprising at least two concentric interconnected annular channels, a fluid inlet means and a fluid outlet means including a fluid inlet opening in one channel, a fluid outlet opening in another of said channels, the said inlet and outlet openings being arranged such that fluid flows from the inlet opening through all of the channels of that ring in succession and then through the outlet opening, whereby the coolant circulates more than once around each ring, and means for defining an opening in the housing in the plane of the brake disc means for installation and removal of the brake disc means in a radial direction out from between the brake ring and thrust ring without moving said rings and hence also without disturbing the coolant liquid flow channels.

2. A disc brake according to claim 1, said actuating means comprising a hydraulic actuating means including a cylinder in the housing and a piston in the cylinder operatively engaging with the thrust ring.

3. A disc brake according to claim 1, said actuating means comprising a mechanical actuating means including a spreading means for moving the thrust ring against the brake disc means to operate the brake when the spreading means is rotated about the shaft axis.

4. A disc brake according to claim 1, the means defining the channels of each ring including an annular recess on the side of the ring opposite from the braking surface, inner, outer and central annular flanges projecting into the recess, sealing means sealing the inner and outer flanges against the radial inside and outside of the recess, respectively, and the central flange constituting a rib separating the recess into said two concentric channels.

5. A disc brake according to claim 4, all three flanges being integral with their ring and extending outwardly therefrom, a portion of the housing closing the other side of said channels.

6. A disc brake according to claim 4, the inner and outer flanges being integral with their ring, and the housing closing the other side of the channel, the central flange being integral with the housing and extending therefrom into and across the recess.

7. A disc brake according to claim 4, the inner and outer flanges being integral with their respective ring, and a separate element forming the central flange, and a backing plate closing the other side of the channels and sealingly connected to its respective ring.

8. A disc brake according to claim 7, said backing plate being soldered to its respective ring.

9. A disc brake according to claim 4, all of said flanges and the side opposite from said braking surface of the ring being integral, the coolant channels thus being contained wholly within their respective ring.

10. A disc brake according to claim 1, said coolant channels being integral with and formed as sealed channels within their respective ring.

11. A disc brake according to claim 1, said means defining an opening comprising a space formed in the stationary housing large enough for the brake disc means to be installed and removed therethrough, and a removable cover plate covering said space.

12. A disc brake according to claim 1, said mounting means for the disc brake means comprising a sleeve member projecting axially into the housing, the shaft rotatably engaging the inside of the sleeve and the brake disc means engaging the exterior of the sleeve for rotation therewith and for axial movement therealong, the sleeve being removable axially from the space between the planes of the said ring braking surfaces.

13. A disc brake according to claim 1 wherein the floor path cross-section of said channels from said inlet means to said outlet means is constant and the coolant system is designed for a fluid speed of one to three meters per second in said channels.

14. A disc brake according to claim 1, said brake disc means including a group of at least two parallel brake discs, said brake ring and said thrust ring located on opposite sides of the group, and including, in the space between adajcent brake discs, a further brake ring having braking surfaces facing each adjacent brake disc and including means defining a said coolant fluid path within said further brake ring, said further brake ring being axially movable within the housing such that when the actuating means moves the thrust ring, the further braking ring is also movable so that all of the braking surfaces and the brake discs can be urged against each other for a braking operation.

15. A disc brake according to claim 1, said actuating means comprising both a mechanical actuating device and a hydraulic actuating device, these two devices being operable either together or independently of each other to actuate the brake.

16. A disc brake according to claim 15, said hydraulic actuating device including a cylinder in the housing and a piston in the cylinder operatively engaging with the thrust ring.

17. A disc brake according to claim 15, said mechanical actuating device including a spreading means for moving the thrust ring against the brake disc means to operate the brake when the spreading means is rotated about the shaft axis.

* * * * *